C. Flesch,
Lock Tumbler.
No. 113,414. Patented Apr. 4, 1871.

Witnesses:
A.C. Rawlings
N.H. Ellsworth

Inventor:
Chas. Flesch
By J. Fraser & Co
Attorney

UNITED STATES PATENT OFFICE.

CHARLES FLESCH, OF ROCHESTER, NEW YORK.

IMPROVEMENT IN TUMBLERS FOR PERMUTATION-LOCKS.

Specification forming part of Letters Patent No. 113,414, dated April 4, 1871.

*To all whom it may concern:*

Be it known that I, CHARLES FLESCH, of the city of Rochester, in the county of Monroe and State of New York, have invented a certain new and useful Improvement in the Tumblers or Wheels of Combination-Locks, of which the following is a specification:

Nature of the Invention.

This invention relates to an improvement in lock-tumblers or wheels of combination-locks; and it consists of a certain combination of parts, as will hereinafter more fully be described.

General Description.

Figure 1:
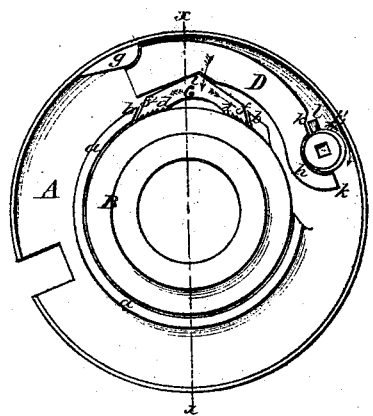
Figure 2:

In the drawing, Figure 1 is a plan of the tumbler, with the cover removed to show the inside arrangement; Fig. 2, a section in the line $x\ x$, Fig. 1.

A represents the rim, and B the center or hub, which, in general construction, is similar to those in general use.

$a$ is a circular rib or flange, which forms the inner boundary of the rim, and which forms the seat against which the center or hub is clamped to retain it in place. On one side this rib is cut away, leaving two angular or dovetailed stops, $b\ b$, which receive the pawl. These stops angle inward toward the center or hub, so that when the pawl is in place it cannot be drawn out except by a side action.

C is the pawl or detent, made in double angular form, as shown, the apex $i$ standing upward, and the bottom being cut away so as to leave a central space, $c$.

The bearing ends $d\ d$ are armed with ratchet-teeth, which point in opposite directions, so as to hold the center or hub from turning either way when clamped in place.

The extremities $f\ f$ are made angular to fit the angles of the stops $b\ b$, between which they rest.

D is a lever, resting against a bearing, $g$, for its fulcrum, and bearing upon the apex of the pawl. Its long end is formed with a concave face, $h$, against which rests the single-acting cam E.

On each side of the cam is formed a stop, $k$, against which strikes the pin $l$ of the cam at each half-revolution. When thrown in the position shown in Fig. 1 the pressure is removed from the pawl, and the center or hub of the wheel is free to be turned to any desired position. When thrown to the opposite side the pawl is clamped against the center or hub, which is thereby securely locked in rib $a$.

The stops $b\ b$ serve to guide the pawl and concentrate its action at both ends directly upon the hub. The angle of the stops allows a slight longitudinal expansion of the pawl and directs it downward, which is much more effective than if the stops were square-ended or blunt, in which case the force would be expended against them, and no spring or elastic action of the pawl would occur to bear upon the hub.

The dovetailed form also enables the pawl to be retained in place when the pressure is removed. The form of the pawl is productive of a good result. The central arch allows it to spring, and the toothed ends cause it to hold in both directions.

There is a degree of elasticity in both the pawl and lever that is effective in holding the hub in place. This form of the pawl is such that it bites into the periphery of the hub, and requires no toothing of the latter, as in other wheels of a similar character.

I am aware that various forms of pawls and levers are employed in lock-tumblers. In one case a solid toothed block is pressed down by the cam upon the hub. In another, double pawls, pointing in opposite directions, engage with teeth upon the periphery of the hub. I do not claim such; but

What I claim, and desire to secure by Letters Patent, is—

The pin $l$ and stops $k\ k$, combined with the cam E and lever D, which act upon the double-ratcheted pawl C, in the manner and for the purpose specified.

CHARLES FLESCH.

Witnesses:
R. F. OSGOOD,
FRED. A. HATCH.